May 4, 1948. J. F. CUNNINGHAM, JR 2,440,933
TURBINE ROTOR
Filed May 11, 1945
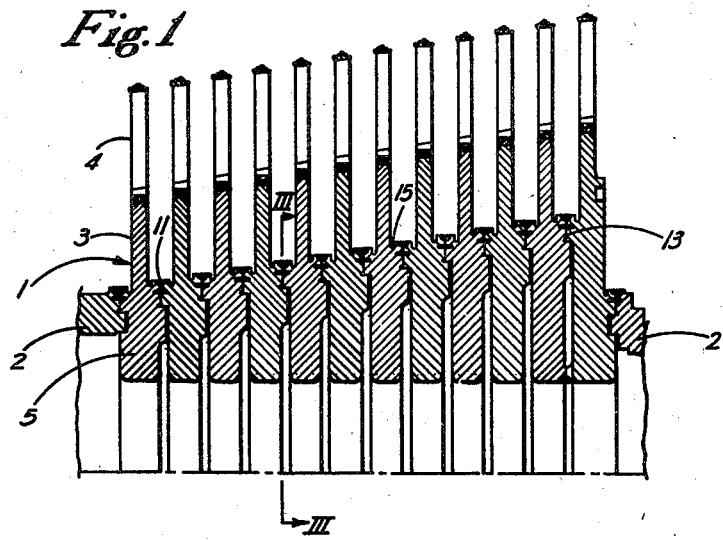
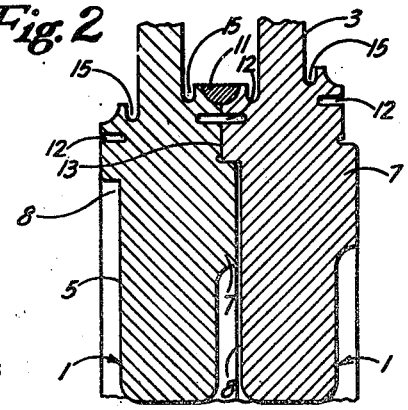
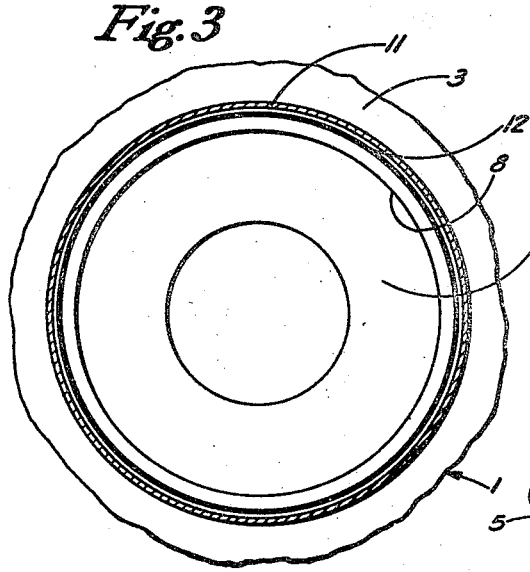
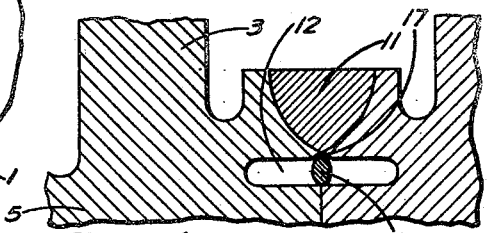
WITNESSES:
V. A. Peckham
E. O. Johns
INVENTOR
John F. Cunningham, Jr.
BY
Brown, Critchlow & Flick
his ATTORNEYS.

UNITED STATES PATENT OFFICE 2,440,933

TURBINE ROTOR

John F. Cunningham, Jr., Greensburg, Pa., assignor to Elliott Company, Jeannette, Pa., a corporation of Pennsylvania Application May 11, 1945, Serial No. 593,193

7 Claims. (Cl. 253—39)

This invention relates to turbines, and more particularly to the rotors that revolve therein.

For several reasons, which it is not necessary to go into, it often is desirable to make the rotors for turbines from a series of discs welded together side by side and supported by stub shafts at their ends. Each disc consists of an annular blade-carrying portion encircling a thickened hub portion that generally is hollow. In welding the hubs together the welding heat tends to cause distortion of the discs and the rotor as a whole which can not be tolerated because the clearances between the rotors and the adjacent parts of the turbine must be very exact. Thermal distortion also sets up stress concentrations which weaken the rotor. A further problem is to make a built-up rotor of this type in which undue stress concentrations of operation are not transmitted to the welded joints.

It is among the objects of this invention to provide a turbine rotor of the welded disc type in which harmful stress concentrations and thermal distortion due to welding are kept at a minimum, in which the only loading on the welds caused by longitudinal bending of the rotor is in tension or compression, in which the only shear stress on the welds is that caused by torsion, and in which the rotor discs are provided with a flexibility that permits them to yield without affecting the welds.

In accordance with this invention a pair of axially spaced stub shafts support a series of rotor discs welded side by side into an integral unit between the shafts. Each rotor disc has an annular portion from which turbine blades project radially and which encircles a hub that is integral with the blade-carrying portion but thicker so that the blade-carrying portions will be spaced apart. Each hub preferably is provided at one side with a circular projection forming an annular shoulder concentric with the hub, while the other side of the hub is provided with a circular recess that receives a like projection on the adjoining hub. There is a shrink fit between each annular shoulder and the side wall of the recess into which it projects, but the end walls of the projection and recess preferably are spaced apart. Adjoining hubs have engaging radial side faces extending around the projections and recesses, and it is the outer marginal areas of these faces that are welded together by welds extending around the hubs.

To reduce flow of welding heat inwardly along the engaging side faces of the hubs, those faces are provided under the welds with annular grooves which serve as heat dams. On both sides of the base of each disc's blade-carrying portion there are circumferential grooves in the hub. These grooves also serve as heat dams to reduce flow of welding heat into the hub. Each annular groove and adjacent circumferential groove are spaced apart such a distance that the thickness of the hub between them is equal to or less than the radial thickness of the adjacent weld. These reduced sections provide ductile adjustment for stress equalization in the rotor.

The preferred embodiment of the invention is illustrated in the accompanying drawings in which Fig. 1 is a fragmentary longitudinal section through the upper half of my rotor; Fig. 2 is an enlarged fragmentary section taken from Fig. 1; Fig. 3 is a fragmentary side view of one of the rotor discs; and Fig. 4 is a fragmentary section, similar to Fig. 2, of a modification.

Referring to Fig. 1 of the drawings, a series of rotor discs 1 of progressively greater outside diameter from the inlet end of the turbine are welded together into a solid unit that is supported by hollow stub shafts 2 welded to the end discs. Each disc has an annular portion 3 from which turbine blades 4 project and which encircles a thick hollow hub 5 integral with it.

In order to properly align the discs and hold them in position while they are being welded together, as well as to materially reduce operating stresses on the welds, the hub of each disc is provided on one side with an integral annular rib 7 concentric with the hub and spaced from its inner and outer edges. The periphery of the rib forms a cylindrical shoulder. All of these shoulders are spaced the same distance from the outer edges of the hubs, regardless of the diameter of the hubs. The opposite side of each hub is provided with a large circular recess 8 having a cylindrical side wall likewise concentric with the hub. The ribs project into the recesses the side walls of which are shrunk onto the rib shoulders to tightly and accurately fit the discs together. These engaging peripheral surfaces are the only surfaces of the ribs and recesses that need be dimensioned accurately, because they are the only surfaces in engagement. The end surfaces of the ribs and recesses are spaced apart, while the end surfaces of the recesses extend radially outwardly from the inner edges of the hubs so that the hubs will not project under the ribs on adjoining hubs. This reduces the amount of machining to accurate dimensions that must be done in order to insure the discs fitting together properly.

The hubs are provided around their ribs and recesses with radial side faces that engage one another between adjoining discs. The welding that unites the discs into a solid rotor takes place at the outer marginal areas of these engaging side faces which are encircled by transversely arcuate grooves for receiving the welding metal. This welding is done by first tack welding adjoining hubs together at circumferentially spaced points and then filling in the space between the tack welds with additional backstepped segmental welds until one continuous weld 11 extends entirely around each joint. Directly under the welds the engaging side faces of the hubs are provided with registering annular grooves 12 that are empty; at least they contain no metal band or the like that would conduct an appreciable welding heat across them, but they may contain suitable heat insulating material if desired, or a drip-arresting ring in case the weld is expected to penetrate to the grooves. These grooves are spaced far enough from ribs 7 and recesses 8 to leave radial faces 13 of material width under the grooves. Also, grooves 12 are spaced from the welding grooves a distance equal to the possible weld penetration.

After the tack welds have been made, the heat associated with the application of the backstepped segmental welds is conducted inwardly along the engaging side faces of the hubs above or outside grooves 12. This heat causes a localized expansion of the hubs lengthwise of the rotor, but as the hubs are held together by the tack welds, the effect of this expansion is to force the locally heated engaging faces together and to crush them locally. Grooves 12 serve as heat dams that interrupt and reduce the flow of welding heat inwardly along the side faces of the hubs so that the hubs in the region of faces 13 do not expand sufficiently to crush faces 13. Consequently, when the hubs have cooled and contracted and the shrinking welds attempt to pull the discs closer together and take up the space between their crushed surfaces, any such shortening of the rotor is prevented by the engaging uncrushed faces 13 which thereby maintain the rotor discs in their original positions.

Another feature of this invention is that the amount of welding heat that may flow from the welds laterally into the hubs, where it might cause thermal distortion or dishing of the hubs, is reduced. This is accomplished by providing the hub on both sides of the blade-carrying portion of each rotor disc with open circumferential grooves 15 that serve as heat dams which impede the flow of heat laterally away from welds 11 parallel to the axis of the rotor. They also reduce the thickness of metal between them and the nearest annular grooves 12 in the sides of the hubs, thereby leaving less metal through which heat can be conducted into the hubs. By making side grooves 12 close enough to circumferential grooves 15 that the distance between them is equal to or less than the radial thickness of welds 11, any loads on the rotor tending to bend it lengthwise cause yielding in the parent material of the discs rather than in the weld itself. Furthermore, each combination of three grooves, consisting of two grooves 15 and groove 12 between them, provides a flexibility in the rotor discs that permits them to yield under the cooling stresses that follow the welding heat.

In the modification shown in Fig. 4 groove 12 is provided with an annular recess 17 in its upper or outer surface, and a drip ring 18 is disposed in the groove where it is held in place by projecting into the recess. The ring is small and makes light line contact with the walls of the groove, so it does not conduct an appreciable amount of welding heat across the groove. Its purpose is to prevent any drops of molten metal that otherwise might drip into groove 12, in case the weld penetrates to the groove, from doing so.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. A turbine rotor comprising a pair of axially spaced stub shafts, a plurality of rotor discs disposed side by side between said shafts by which the discs are supported, each of said discs having an annular blade-carrying portion encircling a hub of greater thickness than said portion, there being a circumferential groove extending radially into each hub at the base of the blade-carrying portion on each side of the latter, each hub being provided at one side with a circular projection forming an annular shoulder concentric with the hub, said hub being provided in its opposite side with a circular recess receiving a like projection on the adjoining hub with the annular side wall of the recess tightly gripping the annular shoulder therein, adjoining hubs having engaging radial side faces around said projections and recesses, and welds extending around the hubs close to said grooves to join together the outer marginal areas of said engaging faces, said faces being provided between said welds and projections with annular grooves.

2. A turbine rotor comprising a pair of axially spaced stub shafts, a plurality of rotor discs disposed side by side between said shafts by which the discs are supported, each of said discs having an annular blade-carrying portion encircling a hub of greater thickness than said portion, there being a circumferential groove extending radially into each hub at the base of the blade-carrying portion on each side of the latter, said hubs having engaging side faces, and welds extending around the hubs to join together the marginal areas of said engaging faces between adjacent circumferential grooves, said faces being provided directly under said welds with empty annular grooves spaced from the welds, and all of said grooves serving as heat dams to reduce thermal distortion of the discs.

3. A turbine rotor comprising a pair of axially spaced stub shafts, a plurality of rotor discs disposed side by side between said shafts by which the discs are supported, each of said discs having an annular blade-carrying portion encircling a hub of greater thickness than said portion, there being a circumferential groove extending radially into each hub at the base of the blade-carrying portion on each side of the latter, said hubs having engaging side faces, and welds extending around the hubs to join together the marginal areas of said engaging faces between adjacent circumferential grooves, said faces being provided directly under said welds with empty annular grooves, and the thickness of each hub between each of its annular grooves and its adjacent circumferential groove being no greater than the radial thickness of the adjoining weld.

4. A turbine rotor comprising a plurality of rotor discs disposed side by side in axial alignment, each of said discs having an annular blade-carrying portion encircling a hub of greater thickness than said portion, there being a circumferential groove extending radially into each hub at the base of the blade-carrying portion on each side of the latter, each hub being provided at one side near its circumference with an annular rib concentric with the hub, said hub having in the opposite side a circular recess receiving a like rib on the adjoining hub with the annular side wall of the recess tightly engaging the outer annular side wall of the rib therein with the rest of the interengaging rib and recess spaced apart, adjoining hubs having fixed engaging side faces around said ribs and recesses extending radially outwardly from the outer ends of the recesses and aligning the discs in final axial position before they finally are joined together, and welds extending around the hub close to said grooves to join together the outer marginal areas of said engaging faces between adjacent circumferential grooves, said faces being provided between said welds and ribs with empty annular grooves and all of said grooves serving as heat dams to reduce thermal distortion of the discs.

5. A turbine rotor comprising a pair of axially spaced stub shafts, a plurality of rotor discs disposed side by side between said shafts by which the discs are supported, each of said discs having an annular blade-carrying portion encircling a hub of greater thickness than said portion, there being a circumferential groove extending radially into each hub at the base of the blade-carrying portion on each side of the latter, each hub being provided at one side near its circumference with an annular rib concentric with the hub, said hub having in the opposite side a circular recess receiving a like rib on the adjoining hub with the annular side wall of the recess tightly engaging the outer annular side wall of the rib therein with the rest of the interengaging rib and recess spaced apart, adjoining hubs having fixed engaging side faces around said ribs and recesses extending radially outwardly from the outer ends of the recesses and aligning the discs in final axial position before they finally are joined together, and welds extending around the hubs close to said grooves to join together the outer marginal areas of said engaging faces between adjacent circumferential grooves, said faces being provided between said welds and ribs with empty annular grooves and the thickness of each hub between each of its annular grooves and its adjacent circumferential groove being less than the radial thickness of the adjoining weld.

6. A turbine rotor comprising a plurality of rotor discs disposed side by side in axial alignment, each of said discs having an annular blade-carrying portion encircling a hub of greater thickness than said portion, there being a circumferential groove extending radially into each hub at the base of the blade-carrying portion on each side of the latter, said hubs having engaging side faces, and welds extending around the hubs to join together the marginal areas of said engaging faces between adjacent circumferential grooves, said faces being provided directly under said welds with empty annular grooves, and all of said grooves serving as heat dams to reduce thermal distortion of the discs.

7. A turbine rotor comprising a plurality of rotor discs disposed side by side in axial alignment, each of said discs having an annular blade-carrying portion encircling a hub of greater thickness than said portion, there being a circumferential groove extending radially into each hub at the base of the blade-carrying portion on each side of the latter, said hubs having engaging side faces, welds extending around the hubs to join together the marginal areas of said engaging faces between adjacent circumferential grooves, said faces being provided directly under said welds with annular grooves, and a drip ring disposed in the annular grooves directly under each weld to catch any molten metal that attempts to drop into those grooves, each ring occupying only a small part of the area of the grooves in which it is disposed, and all of said grooves serving as heat dams to reduce thermal distortion of the discs.

JOHN F. CUNNINGHAM, Jr.

REFERENCES CITED

The following references are of record in the file of this patent:

UNITED STATES PATENTS

| Number | Name | Date |
| --- | --- | --- |
| 2,179,556 | Lysholm | Nov. 14, 1939 |
| 2,200,287 | Lysholm | May 14, 1940 |
| 2,317,092 | Allen | Apr. 20, 1943 |
| 2,369,051 | Huber | Feb. 6, 1945 |

FOREIGN PATENTS

| Number | Country | Date |
| --- | --- | --- |
| 214,461 | Switzerland | July 16, 1941 |
| 218,177 | Switzerland | Mar. 2, 1942 |